Oct. 20, 1970 G. H. FREIER 3,534,967
RECORD PLAYER HAVING KEY OPERATED CONTROLS
Filed Feb. 13, 1967 3 Sheets-Sheet 1

Inventor
Gerald H. Freier
By Brown, Jackson, Boettcher & Dienner
Att'ys.

Inventor
Gerald H. Freier
By Brown, Jackson, Boettcher & Dienner
Att'ys.

RECORD PLAYER HAVING KEY OPERATED CONTROLS

Filed Feb. 13, 1967 3 Sheets-Sheet 3

Inventor
Gerald H. Freier
By Brown, Jackson, Boettcher & Dienner
Att'ys

United States Patent Office

3,534,967

Patented Oct. 20, 1970

3,534,967

RECORD PLAYER HAVING KEY OPERATED CONTROLS

Gerald H. Freier, Benton Harbor, Mich., assignor to V-M Corporation, Benton Harbor, Mich., a corporation of Michigan

Filed Feb. 13, 1967, Ser. No. 615,764

Int. Cl. G11b *17/08*

U.S. Cl. 274—10 20 Claims

ABSTRACT OF THE DISCLOSURE

Record changer has "Manual" and "Automatic" play initiating keys to close a switch in the turntable motor circuit which then remains latched until the last record is played. These keys also momentarily close a second switch which starts the change cycle mechanism motor. An "Off" key holds the second switch closed until all the records are lowered to the turntable. A "Cue" key operates a cue arm through a compressible spring to manually raise and lower the pick-up arm, a viscous dampener countering the spring force provides velocity control during manual set-down and elevation of the pick-up arm.

This invention relates to record players and particularly to a novel arrangement of key-operated controls which initiate the operating functions of the record player.

A general object of the invention is to provide controls for initiating the operating functions of a record player which is easily manipulatable and appropriate in their operation.

A second and related object of the invention is to provide such an arrangement of controls which is also inexpensive to manufacture and yet particularly reliable in their operation.

It is known to provide record changers with motor driven mechanisms which will, when the motor is energized, lower the bottom one of an overhead supported stack of records to the turntable below, properly locate the pick-up arm with its stylus in position over the starting groove of the lowered record and then lower the tone arm to play the record whereupon the cycle changing mechanism is temporarily halted until the stylus of the automatically initiated each time play of one record is pick-up arm reaches the inner groove at the end of the motor circuit is automatically closed to restart the cycle changer mechanism which first raises the pick-up arm and after moving the arm beyond the record repeats the above described cycling operation of lowering the bottom record from the stack, locates the pick-up arm and lowers it to play the record. Commonly, however, because the pick-up arm is located in a rest position to one side of the turntable at completion of play of the last record and in any event to permit removal of the records from the center spindle an auxiliary switch is provided in the cycle changer motor circuit which is momentarily closed to start the changer motor in order to permit lowering the first record. However, thereafter the cycling mechanism is automatically initiated each time play of one record is completed, and after the last record has been played the pick-up arm is moved to its initial position of rest. An example of such a cycling mechanism and with which the present invention is useful is illustrated, described and claimed in the copending application of Robert Hammond and John Arent, Ser. No. 582,689, which is owned by the assignee of this patent application, and the disclosure of which is herein incorporated by reference thereto.

It is a principal object of the present invention to provide a record player with means whereby such changer cycle mechanism may also be utilized to permit the record player to play a single record initially located in the storage position, as for example, of the center spindle.

Thus it is a feature of this invention that the record changer is provided with two actuating keys, both of which act on one lever to close a first switch which completes a circuit to a motor which rotates the turntable and which keys also act on a second lever to close a second switch which completes the circuit of a second motor which operates the change cycle mechanism.

In accordance with the invention latch means are associated with the first switch operating lever so that said first switch remains closed and the turntable will continue to rotate until the latch means is realesed by the change cycle mechanism after the last record has been played and the pick-up arm moved to its position of rest. Thus the invention provides for automatically turning off the record changer at the end of record play.

Also, in accordance with the invention, one of said keys, hereinafter identified as the "manual" key, acts on a cue arm which raises the pick-up arm and also actuates a latch which holds the lever and thereby the pick-up arm in a raised position until the latch is subsequently deactivated, as by manual actuation of a third key.

Thus it is a feature of the invention that when one of the two keys termed the "automatic" key is actuated, the record changer operates normally. That is to say, the records of the stack supported above the turntable are each lowered, one at a time, and played, and at the end of play of the last record the changer is turned off. However, when the second or "manual" key is actuated the records stored on the upper portion of the center spindle is also lowered to the turntable and the pick-up arm is properly positioned over the starting groove of the record after the size of the record has been sensed to determine the appropriate position for the pick-up arm. However, the pick-up arm is not lowered, but is held in a raised position until the third or "cue" key is actuated. It is also a feature of the invention that the cue arm which raises the pick-up arm may be pivoted and its latch set by operation of either the "manual" or the "cue" keys and also may be delatched by a second actuation of either of said keys. Of consequence, whether raising and latching of the cue arm is initiated by the manual or the cue key, either key may be actuated to effect lowering of the pick-up arm stylus to the record and to initiate play thereof.

An important feature and/or advantage of the invention rising out of this arrangement is that it not only permits the operator to first lower the record and position its pick-up arm over the starting groove of the record by depressing the manual key, and then delay initiation of record play, but it also permits the operator to interrupt record play at any moment by actuating the cue key to raise the pick-up arm and latch it in raised position and subsequently rest the stylus of the pick-up arm back on the record and in the same position of the groove at which play was interrupted.

A further feature of the invention is that provision is made so as to promote a positive lift of the tone arm stylus out of the groove while the record is rotating to interrupt play, and also to control the lowering of the stylus so that in either lifting or lowering of the stylus there will be minimum opportunity for damage to the record groove.

Another important feature of the invention is the provision of a fourth key, which when actuated operates only the changer motor switch, but has associated therewith a latch which effectively locks the changer motor switch in its closed position until the power switch lever is delatched, as at the end of play of the last lowered record and the resetting of the pick-up arm in its rest position.

This provides the important advantage, and is accordingly a feature of the present invention, that the change cycle mechanism can be held in a continuous rejecting operation until all the records are lowered to the turntable. Of consequence the overhead record storage position of the record player is always automatically emptied of records so that none can remain on the center spindle so as to be damaged or to damage the spindle during periods when the record player is shut off.

A further feature of the invention is the provision of means whereby the latch set by actuation of the off key may however be delatched as when the off latch has been accidentally actuated and/or when the off key has been actuated to permit selection of a specific record higher up in the stack without having to play all the intervening records.

Thus in accordance with the invention, a record player is provided having four control keys designated "off," "automatic," "manual" and "cue." The off key serves, when operated, to hold the record player in continuous reject until automatic shut-off occurs, once the record supporting spindle is empty. Operation of the automatic key serves to turn on the record player and also to initiate lowering of the first record for play. Also after the last record has been played it provides for automatically turning the record player off. The manual key, when actuated, also turns the machine on and starts the first change cycle mechanism to lower the single record which has been previously placed in the storage position of the center spindle for manual play. It also operates the cue lever which holds the pick-up arm in position over the starting groove of the record after it has determined said position by first sensing the size of the record. The cue key, when operated, performs the mechanical function of lifting and lowering the pick-up arm, for example after the manual key has been operated to initiate playing of the single lowered record. It may be also operated to interrupt record play and restart play.

Other objects and/or features and advantages of the invention are the provision of the four keys as spring biased depressible members which are located in closely adjacent relation at a convenient location on the base plate of the record player so as to simulate the appearance of the keys of the piano keyboard and to be capable of similar operation. Another feature and/or advantage is the arrangement of the control keys as well as their interengaging linkages and cooperating latches such that all of the above recited features and advantages can be obtained in a structure utilizing a minimum number of working parts and one which can be produced at minimum cost without sacrificing efficiency and effectiveness of their control function.

Many other objects, features or advantages of the invention will be apparent from the following description of an illustrated embodiment thereof, given for the purpose of disclosure and taken in conjunction with the accompanying drawings in which like character references designate like parts throughout the several views and where:

Figure 1:
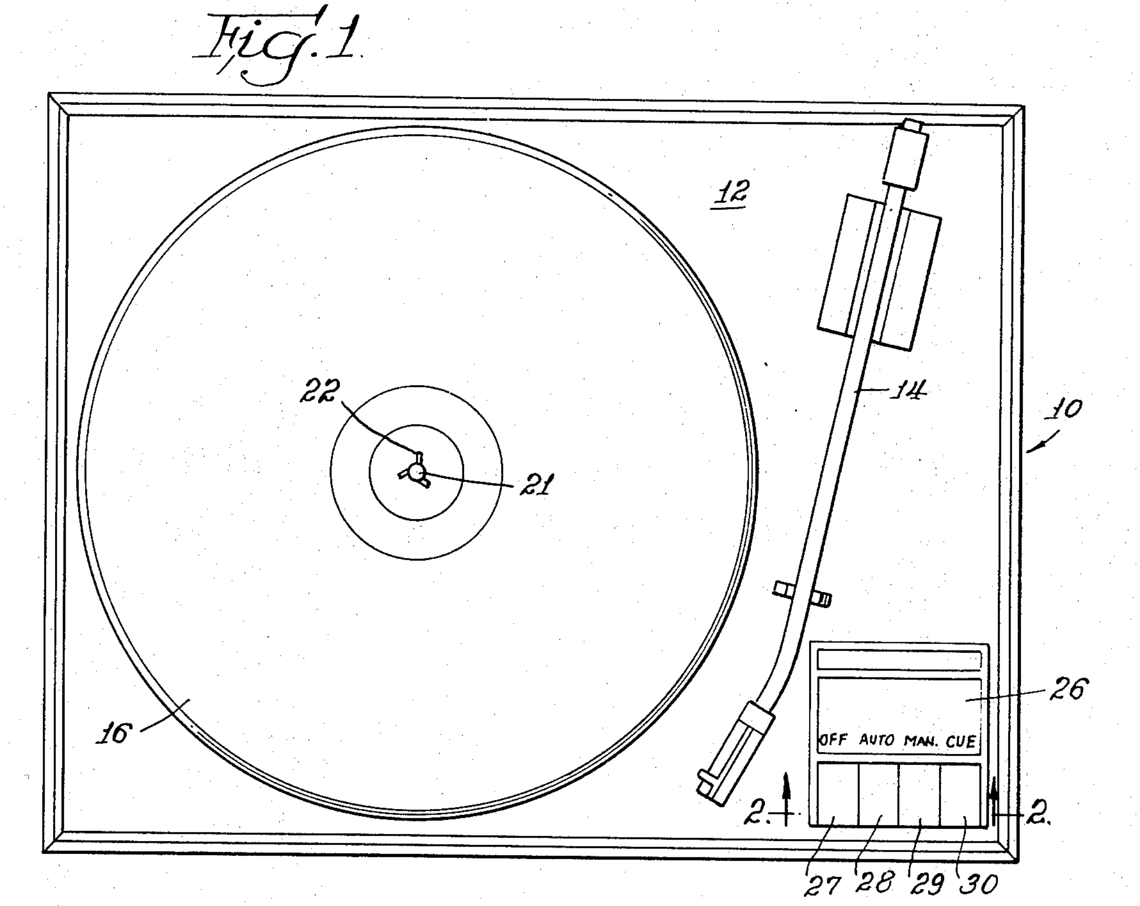
FIG. 1 is a top plan view of a record changer having a control panel embodying depressible keys and associated mechanism for operating the record changer either manually or automatically in accordance with the present invention.
Figure 11:
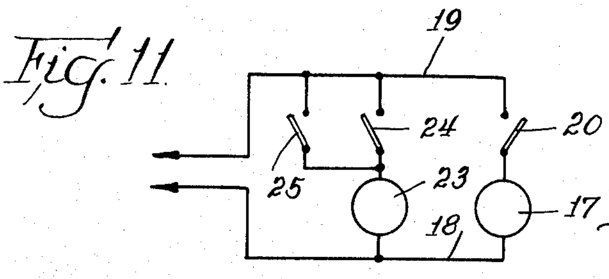
FIG. 11 is a schematic wiring diagram of the operating control circuit for the record changer.

Referring now more specifically to the several views which illustrate the invention, and first to FIG. 1, the invention is shown embodied in a record player or changer of conventional construction and indicated generally at 10. For the purposes of this description, such a changer will be understood to include a base plate 12 beneath which is suspended a sub-plate 56 (FIG. 8) carrying a pivotally mounted tone arm 14 having an associated stylus (not shown) and a rotatably mounted turntable 16 adapted to be driven by turntable drive motor 17 (FIG. 11) mounted on the underside of base plate 12 and connected to a suitable source of electric energy by leads 18, 19 upon closing of power switch 20. Located centrally of turntable 16 and about which the turntable rotates is a center spindle 21 provided with record lowering means indicated generally at 22 which are adapted to support a supply of records in the upper portion of the center spindle and include means actuatable to permit lowering of the bottom record only from said stack to the turntable for rotation therewith. Suitable change cycle mechanism (not shown) but which are understood to be of conventional construction are utilized for first operating said lowering means 22 to effect lowering the bottom record only of said stack of records thereon, then raising the pick-up arm 14 from its illustrated position of rest and moving it inwardly to sense the size of the record being lowered, then after the record has been completely lowered to the turntable 16 positioning the stylus of said pick-up arm over the starting groove of the record and lowering the pick-up arm so as to locate the stylus in the groove of the record to play the record with rotation thereof by the turntable 16. Such change cycle mechanism may be a cam having associated levers as shown and described in the mentioned Hammond and Arent application Ser. No. 582,689. Thus in FIG. 11, 23 may be considered as a cycle changer motor adapted to operate the cam, for example, shown in Ser. No. 582,689, when switch 24 is closed. As described in said application Ser. No. 582,689, switch 24 may be of the light actuated type and adapted to remain open during record play and closed when the pick-up arm is moved to its inner position as at the end of play of the record. Closing of switch 24 causes motor 23 to actuate the cycle change mechanism through one cycle in which the pick-up arm is first raised off the record and then moved beyond the record a safe distance after which it actuates the lowering of a record, positioning of the pick-up arm and lowering thereof to locate its stylus in the rotating record as described above. Thereafter it causes switch 24 to open and motor 23 to stop in which condition the switch remains until after completion of playing of the next lowered record. Because switch 24 is normally open and is closed only when the pick-up arm is inwardly of the record to the end of its play groove a second switch 25 is provided in bypassing relation to switch 24 which can be temporarily closed to start motor 23. As soon as the cycling mechanism is actuated it holds switch 24 closed until the complete change cycle has been carried out. Of consequence, switch 25 need be only momentarily closed, that is long enough to start the cam or other change cycle actuating mechanism which will thereafter close switch 24.

Referring still to FIG. 1, the present invention embodies apparatus for the appropriate operation of switches 25 and 20 and pick-up arm 14 by which the record changer may be operated either automatically or manually. This apparatus is shown supported within a main housing 26 and includes four depressible keys arranged in a line and simulating a piano keyboard. In said FIG. 1 they are respectively identified as "off" key 27 which is depressed for turning the record changer off, an "automatic" key 28 which is operated to set the record player for automatic play, a "manual" key 29 which is operated to set the record player for manual play and a "cue" key 30 which is actuated for manually manipulating or cueing the placement of the tone arm 14 and its stylus on a record.

Figures 4, 5, 6, 9, 10:
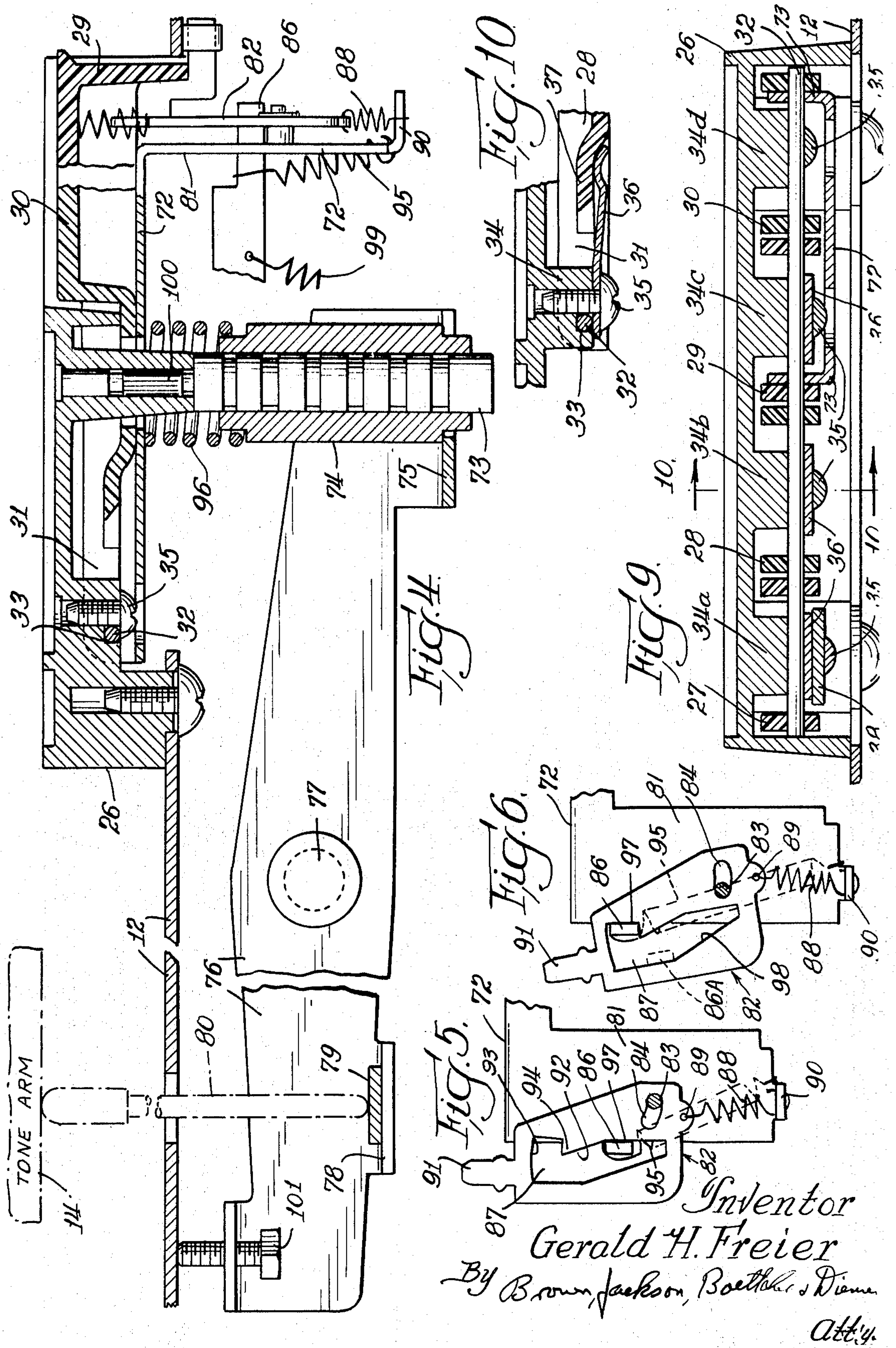
FIG. 4 is a sectional view taken along lines 4—4 of FIG. 7 looking in the direction indicated by the arrows and illustrates details in the construction of the cue arm used for manually raising the pick-up arm and the two keys operatively associated therewith.
FIG. 5 is an enlarged view taken of the cue arm latch illustrating the same when in an unlatched condition.
FIG. 6 is a view generally similar to FIG. 5, but showing the cue arm latch in a latched condition.
FIG. 9 is a sectional view taken along lines 9—9 in FIG. 7 looking in the direction indicated by the arrows.
FIG. 10 is a fragmentary sectional view taken along lines 10—10 of FIG. 9 looking in the direction indicated by the arrows, the last two views illustrating one arrangement for pivotally mounting the four control keys to the housing or control panel.
Figures 7, 8:
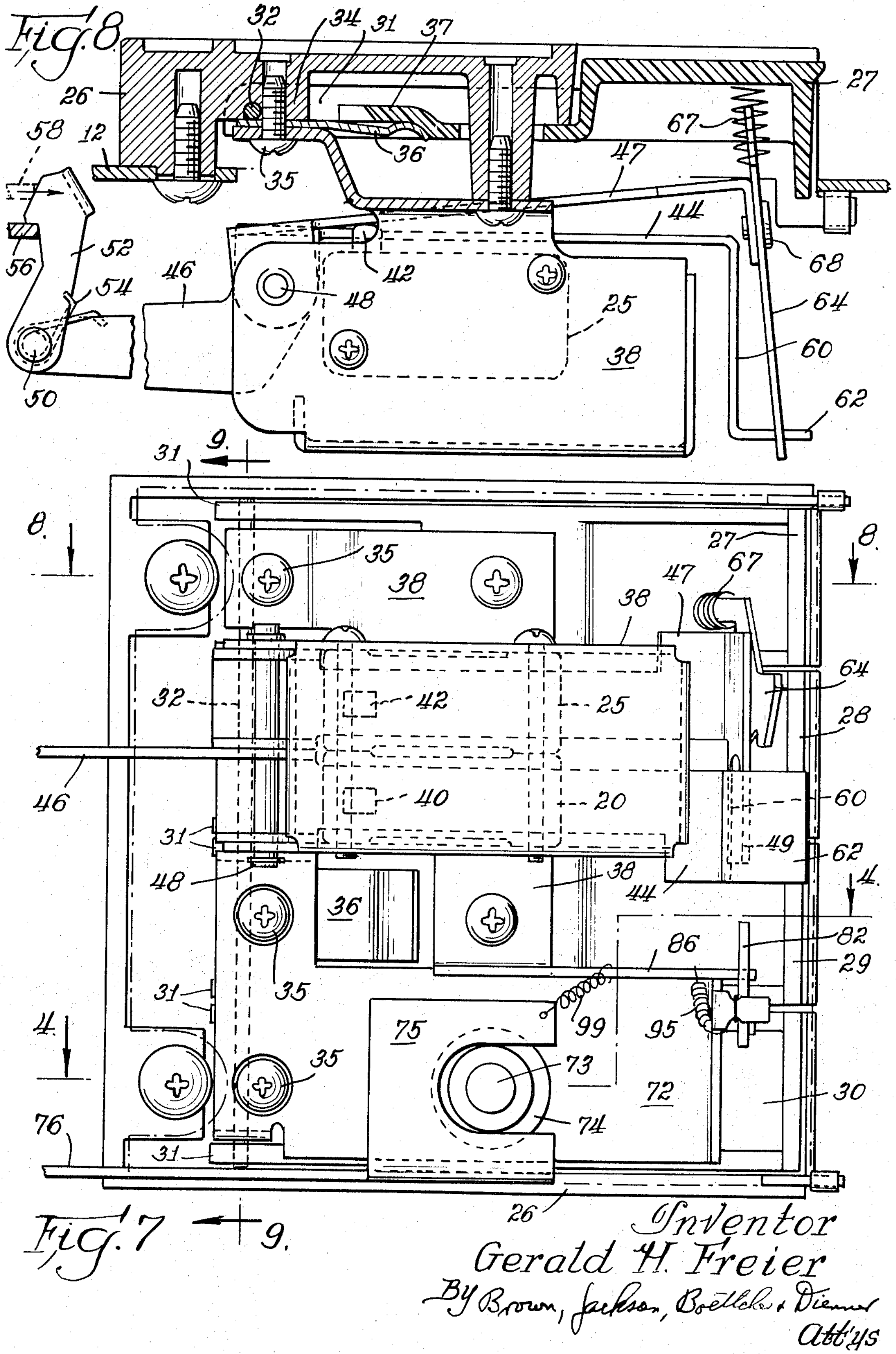
FIG. 7 is a bottom plan view of the control mechanism comprising the present invention.
FIG. 8 is a sectional view taken along lines 8—8 in FIG. 7 looking in the direction indicated by the arrows.

Referring now to FIGS. 7, 9 and 10, each said keys 27, 28, 29 and 30 have bifurcated inner ends constituting spaced ears 31 which are pivotally mounted to the housing 26 by means of a horizontally extending pivot pin 32 which passes through aligned apertures provided in each of said pairs of spaced ears, pivot pin 32 seating in a provided notch 33 in each of bosses 34 formed integral with the top wall of housing 26 and located in the spaces between the ears 31 of each said case. Overlying notch 31 in each of bosses 34*b*, 34*c* and 34*d* are leaf springs 36 held in place as by screws 35 which thus lock said pivot pin 32 and thereby keys 27, 28, 29 and 30 to said housing wall 26. The head of screw 35 in boss 34*a* also overlies pivot pin 32 in holding it in place. As shown best in FIG. 10, each of said leaf springs 36 has a free end biasing against a shelf portion 37 of keys 27, 28 and 29 respectively such that any one of said three keys may be manually deepressed so as to pivot about pin 32 and will be biased by said springs so as to be returned to their illustrated parallel relation with the top wall of housing 26 upon release of said exerted manual pressure. Although a leaf spring might also be similarly provided in association with cue key 30, preferably said release spring is omitted for reasons which will hereinafter be made clear.

Referring now to FIGS. 7 and 8, at 38 is a bracket suitably bolted to the housing 26 which supports the power switch 20 and reject or change cycle mechanism switch 25 in the illustrated side-by-side relationship. Each said switch is of the single pole, single throw, normally open type and are provided with spring backed operating toggles 40 and 42 respectively. Pivotally mounted to bracket 38 as by pivot pin 48, is a shut-off arm 44 which overlies toggle 40 so as to operatively close power switch 20 when it is pivoted in a clockwise direction as seen in FIG. 8. Similarly pivotally mounted to said bracket 38 and so as to overlie the housing of switch 25 is a reject arm 47 which also actuates a toggle 42 of reject switch 25 and it is pivoted clockwise about pin 48 as seen in FIG. 8. Referring now to FIG. 7, it will be seen that a segment of shut-off arm 44 underlies portions of both the automatic key 28 and the manual key 29 wherefore arm 44 may be actuated to close power switch 20 by either key, and thereby to effect rotation of the turntable 16. The spring backing toggle 40 is sufficiently strong that it tends to return shut-off arm 44 to its normal position upon release of pressure on either key 28 or 29. Of consequence power switch 20 would remain open on return of the depressed key 28 or 29 by operation of its cooperating spring 36 except for the fact that shut-off arm 44 is also provided with a rearwardly extending portion 46 on the end of which is pivotally connected as at 50 a shut-off arm latch 52 biased therefrom by means of a spring 54. As illustrated by FIG. 8, latch 52 is raised by clockwise rotation of shut-off arm 46 into releasable hooking engagement about sub-plate 56. The engagement of latch 52 about sub-plate 56 effectively locks the power switch 20 in a closed position so that the turntable drive motor 17 continues to be supplied with power to effect rotation thereof. 58 represents a knock-off bar actuated by the changer cycle mechanism after the last record has been played and the pick-up arm 14 has been moved inwardly as to sense that no record remains to be lowered to the turntable and/or when the pick-up arm has been returned to its rest position as illustrated in FIG. 1. Knock-off bar 58 when thus actuated by the change cycle mechanism serves to release latch 52 from its engagement over plate 56 allowing the spring backed toggle 40 to rotate the shut-off arm 44 in the opposite direction and to reopen the power switch 20 to shut off the turntable drive motor 17.

The forward end of reject arm 47 is also provided with a depending and laterally extending portion 49 located outwardly beyond the extent of shut-off 44 and positioned so as to be engageable by either key 28 or 29 when the same is depressed. The depression of either the manual key 29 or the automatic key 28 therefore also operate reject arm 47 so as to depress toggle 42 and close reject switch 25 which as described initiates the change cycle mechanism. The spring backing of toggle 42 is also adequately strong to return the reject arm 47 to its normal position and so that switch 25 is only temporarily or momentarily closed. Thus depression of either the automatic key 28 or the manual key 29 serve to simultaneously operate both the reject arm 47 and the shut-off arm 44 to close the reject switch 25 and power switch 20 respectively. Upon release of the depressed key, whether it be the automatic or manual key, the reject arm 47 is immediately returned to its raised position by the action of toggle 42 so that reject switch 25 opens. However, shut-off arm 44 remains latched as at 56 so power switch 20 remains closed.

Figure 2:
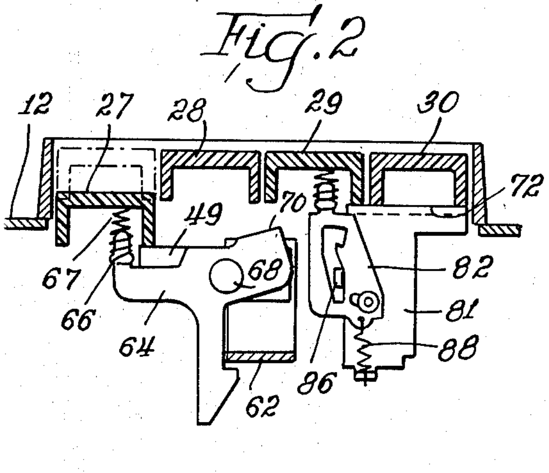
FIG. 2 is a vertical sectional view taken along lines 2—2 of FIG. 1 looking in the direction indicated by the arrows and illustrates the position of the elements comprising the control mechanism when the off key has been depressed.

If it is necessary or desired to shut off the changer without waiting to play all of the records stored in the upper portion of the spindle 21 this can be attained by manually depressing the "off" key 27. For this purpose as seen in FIG. 2, portion 49 of the reject arm is dimensioned so that it also extends beneath key 27. It also simultaneously operates a latch 64 so that the reject arm 47 and thereby reject switch 25 is held closed in order that the change cycle mechanism will continue to cycle but without playing any of the records until the last record has been played whereupon, as described, latch 52 is released by knock-off bar 58, allowing the shut-off arm 44 to open switch 20 which also releases the latch so as to simultaneously open reject switch 25. Thus referring to FIG. 8 considered with FIG. 2, it will be seen that shut-off arm 44 includes a depending portion 60 on its forward side having an outwardly turned lip 62. It will be recalled that upon operation of either the manual key 29 or automatic key 28, shut-off arm 44 is held in down position by latching of its member 50 to about sub-plate 56. Portion 60 of said shut-off arm 44 and also its outwardly extending lip 62 therefore also held in a lowered position as illustrated by full lines in FIG. 3; the release position of the lip being shown by dotted lines 62*a*.

Figure 3:
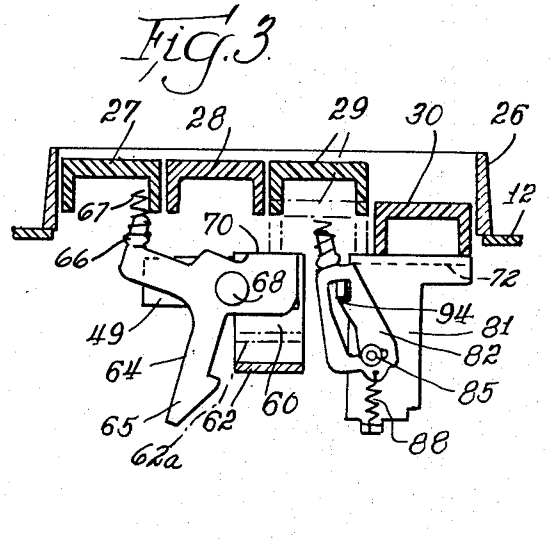
FIG. 3 is a sectional view generally similar to FIG. 2 and indicates the position of the elements which are actuated when the manual key is depressed.

As shown in FIG. 3, latch 64 is pivotally mounted at 68 on portion 49 of the reject arm 47. Latch 64 includes a depending open portion 65 spaced immediately below pivot 68 and normally in a spaced position from lip 60 as illustrated in said FIG. 3. Latch 64 is also provided with an actuator portion 66 disposed above and to one side of pivot 68 and carrying a spring 68 which abuts the lower surface of the "off" key 27 so as to be compressed thereby on depression of said key 27. With the shut-off arm 44 in its latched position, depressing key 27 thus acts on the reject latch 64 through spring 67 to pivot said reject latch about its pivot connection at 68 so as to hook its portion 65 under lip 62, as illustrated by FIG. 2. Latch 64 therefore remains caught, although spring 36 returns the off key to its illustrated or normal position. In the caught position of reject latch 64 the reject arm 47 is held down so that toggle 42 holds the reject switch 25 closed and the change cycle mechanism continues to operate. However, after the last record has been lowered and the tone arm has been moved to sense that no record remains for lowering and/or it has been returned to its rest position, the shut-off arm 44 is released by knock-off bar 58 which allows depending portion 60 thereof and its lip 62 to rise under the biasing action of toggle 40 on the shut-off arm 44. Latch 64 and more particularly its hook end 65 initially moves upwardly with the rising portion 60 of the shut-off arm until its spring 67 strikes the lower surface of the off key 27, whereupon the upward progress of reject latch 64 is slowed and as lip 62 continues to rise latch 64 and particularly its hooked end 65 is freed therefrom so that it is now rotated to its neutral or original position as shown in FIG. 3. With the reject arm 47 and shut-off arm 44 now both pivoted to their raised positions, reject switch 25 and power switch 20 are simultaneously shut off and the record changer 10 ceases to operate.

If the operator changes his mind after pressing the off key 27, or has done so intentionally in order to bypass one or more of the records in the stack in order to select one higher up in the stack for lowering to the record and playing, provision is also had in the form of ramp 70 provided on the reject latch 64 by which the latch 64 may be released to reopen reject switch 25. Seen in FIGS. 2 and 3, ramp 70 is located to the opposite side of pivot 68 from actuator portion 66 and is located beneath portions of both automatic key 28 and manual key 29 wherefore either key may be depressed after the off key has been depressed to latch the reject arm 47 in down position with the result that the reject latch 64 will be rocked clockwise about pivot 68 and so that its hook 65 is released from beneath lip 62 whereupon reject arm 47 will be freed to open the reject switch 25. Thereafter the cycling mechanism will continue to operate but only until the cycling mechanism has next moved the tone arm into position over the record and lowered its stylus into playing engagement within the record groove. As noted above, in normal operation of the cycle change mechanism which is occurring, switch 24 also opens so that with both switch 24 and switch 25 open the cycling operation ceases until the record has been played by the stylus tracking in the groove of the record. Thereafter the cycling operation will proceed in a normal manner until all the remaining records have been lowered and played.

As described, when several records are stored on spindle 21, for successive lowering one at a time and playing thereof, this is initiated by pressing the automatic key 28 whereupon the cycle changer and the mechanism associated therewith proceed as described. However, when only one record is located on the spindle in its storage position, either the automatic key 28 or the manual key 29 may be depressed to initiate its lowering and playing. The advantage of using the manual key to initiate the operation is that although depression of the manual key simultaneously actuates the power switch 20 and also the reject switch 25 as does depression of the automatic key 28 to start the turntable and lower the record and size sense its size for proper positioning of the pick-up arm thereover, actual lowering of the tone arm to play the record is delayed until either the cue key 30 or the manual key 29 is depressed a second time. This is because the initial act of depressing manual key 29 simultaneously acts on a portion of cue plate 72 which is pivotally mounted as by ears 73 to pivot pin 32 (FIGS. 7 and 9) in underlying relation to the pivotal connection of the cue key 30 and manual key 29 (FIG. 9). As shown in FIG. 2, cue key 30 normally rests on cue plate 72 and a portion thereof is also engaged by the manual key 29 wherefore actuation of either key depresses the cut plate 72. Referring now to FIG. 4, it will be seen that a ribbed pin 73 extends through a provided opening in cue plate 72 and is suitably secured to housing 26 as in boss 100. Cue plate 72 engages a spring 96 encircling pin 73 so as to bias collar 74 which also surrounds pin 73 and is positioned to engage ledge portion 75 of cue arm 76 shown pivotally mounted at 77 to base plate 12. Of consequence, by depressing cue plate 72 the force thereof will be transferred through spring 96 and collar 74 to rotate cue arm 76 in a clockwise direction to raise its free end located to the other side of pivot 77. As shown its free end is provided with an integral lip 78 having releasable engagement with a lift plate 79 supporting a lift pin 80 for engagement with the underside of pick-up arm 14. Lift plate 79 is movably supported on subplate 56 and is normally operated by the change cycle mechanism to effect raising and lowering of the tone arm 14 about its horizontal pivotal connection at the proper moments in a change cycle. By the described construction of cut arm 76 the operation of lift plate 79 in the change cycle sequence is not interfered with. At the same time, however, it is also possible by depressing cue key 30 or manual key 29 to rock the cue arm 76 about pivot 77 to effectively act on the lift plate 79 and thereby to raise the tone arm 14 to prevent the change cycle mechanism from lowering of the tone arm. At 101 the free end of cut arm 76 is provided with an adjustable abutment for limiting the upward rise of said cue arm end when rocked about pivot 77.

Means in the form of cue latch 82 are also provided for latching the cue plate 72 and thereby the cue arm 76 in a position where the tone arm 14 will be held at an elevated height and so that it can be lowered only at the will of the operator. Referring therefore to FIGS. 5 and 6, which should be considered in conjunction with FIGS. 2, 3 and 4. Cue plate 72 is seen to include a forwardly located depending portion 81 to which is pinned the cue plate latch 82 as by stud 83 which passes through an arcuate slot 84 in said cue latch 82 and is provided with a C washer 85 over its outer end which prevents the latch 82 from being disengaged from the stud. Associated with the cue latch 82 and extending into the provided cam opening 87 thereof is a stationary arm or portion 86 of the switch housing bracket 38. At 88 is a spring which connects between opening 89 immediately below arcuate slot 84 and outstanding portion 90 of the depending portion 81 of the cue plate 72. As shown in FIG. 5, when the latch plate is in its normally released state, the connection of, spring 88 to latch 82 lies below and to the left of pin 83. Spring 88 therefore exerts a vertical pull on the cue latch 82 which tends to hold to latch 82 in the illustrated position with stud 83 in the upper right hand end of arcuate slot 84. In this condition the cue plate 82 is extending generally vertical, the upward curvature of slot 84 cooperating therewith in this function. In this released position of the cue latch 82, arm 86 is illustrated adjacent the lower end of the cam opening 87 and engaging surface 97. Cue latch 82 includes an actuating stem 91 which may optionally be provided with a surrounding compressible spring and is located beneath the manual key 29 so as to be engaged thereby on depression thereof. The act of depressing the manual key 29 exerts a downward force on the cue latch 82 at a point above and to the left of pivot stud 83. The effect thereof is to move the cue latch 82 and also the cue plate 72 in a downward direction as it rocks cue arm 76 about its pivot 77 to raise the tone arm 14. As this occurs, arm 86 being stationary, the cue latch 82 is caused to follow a path induced by the outwardly inclined cam portion 92 which now engages arm 86. As the cue latch 82 continues to be lowered shelf 94 moves below arm 86 and as this occurs the bias of spring 88 in cooperation with the downward pressure of the manual key on stem 91 further rocks the cue latch 82 until surface 93 of cam opening 87 engages arm 86. Thereupon the action of spring 95 (FIGS. 4 and 7) causes ledge 94 of latch 82 to bear against arm 86 the cut latch 82 shifting until stud 83 catches in the left hand upper reaches of the arcuate slot 84 (FIG. 6). The cue plate 72 is now latched in its down position and effectively causing the cue arm 76 to hold lift plate 79 and thereby the tone arm 14 in a locked raised position. It will be appreciated that the same latching action can also be obtained by depressing cue key 30 by reason of its direct engagement with the upper surface of cue plate 72 as is apparent when viewing FIGS. 2, 3 and 4. Upon release of the downward pressure on manual key 29, which accomplishes said rocking of cue arm 76 and its latching, spring 36 cooperating with said key returns it to its normal position. However, because cue key 30 has no such return leaf spring associated therewith, it remains in a lowered position resting on the cue plate 72 as seen in FIG. 3. Therefore the depressed condition of the cue key 30 indicates that the cue arm 76 has been latched and is holding the tone arm 14 in a raised position.

In order to release cue latch 82 and thereby free cue plate 72 from arm 86 to accommodate lowering of the tone arm 14, either the manual key 29 or the cue key 30 may be depressed. As seen best in FIG. 4, spring 95 is biased between arm 86 and outstanding portion 90 at the lower end of depending portion 81 of the cue plate 72. When the cue plate 72 is depressed by either the manual key 29 or by the cue key 30 with the cue latch in its latched condition, as illustrated by FIG. 6, the effect is to relieve the bearing engagement of ledge 94 on arm 86 further stretching spring 95. In this circumstance, spring 88 being connected to cue latch 82 below and to the right of pin 83 takes over to rock the cue latch in a clockwise direction about stud 83. As soon as arm 86 is clear of latch 94 the tension of spring 95 takes over to effectively raise and rock the cue latch relative to the arm 86 until the cue latch 82 assumes a position where arm 86 is in the related position indicated by phantom lines 86*a*. As the cue latch 82 continues to rise the action of spring 95, under the movement of the cue latch in effect causes arm 86 to follow along inclined surface 98 of the cam opening 87, the cue latch 82 thereby being forced now to shift to the left until stud 83 is again caught in the upper right hand reaches of arcuate slot 84 whereupon the pull of spring 88 takes over to relocate the cue latch in an essentially vertical position and with arm 86 engaging surface 97 indicating that the latching function of cue latch 82 has been completely relieved. Cue arm 76 is then free to release its hold on lift arm plate 79 and allow the tone arm 14 to lower.

Referring therefore next to FIG. 4, a further and important feature of the invention is the damper arrangement provided through which the cue plate 72 acts on the cue arm 76 and more specifically its ledge 75 in order to avoid sudden raising and/or lowering of the delicately balanced tone arm with possible damage either to said tone arm or to the record groove itself. As previously described, when cue plate 72 is moved downwardly about its pivotal connection at 32 consequent to the depressing of either manual key 29 or cue key 30 and is latched in its down position by activation of cue latch 82, it compresses a spring 96 supported about pin 73 which is securely staked to the upper wall of the control panel housing 26, as at 100. The pressure of cue plate 72 on compression spring 96 is thereby transferred to collar 74 which is similarly slidably mounted about pin 73 containing a viscous material such as silicone grease in the spaces between the ribs which slows the sliding motion of the collar 74 therealong. At 99 is a tension spring caught between a portion of bracket arm 86 and ledge 75 of the cue arm so as to hold the cue arm against the lower end of the collar 74. Thus with depression of the cue plate 72, collar 74 is caused by spring 96 to move downwardly, although dampened by the silicone grease between the spaces of dampening pin 73, to rock the cue arm 76 about its pivotal connection 77 and thereby to raise the pick-up arm 14. Although the downward movement of collar 74 along pin 73 is dampened by reason of the viscous material between the ribs of the pin 73 and also by the reaction of spring 99, the resistance thereof is not matched by the pressure capable of being exerted manually on either the cue key 30 or manual key 29. The dampening effect of the viscous material, however, does tend to assure a positive act in depressing the cue plate 72 through the keys 29 or 30 and also to smooth out the lifting action exerted by the cue arm 76 on the pick-up arm 14. However, when cue latch 82 is released as described, so that no longer is the cue plate 72 exerting a depressing force on spring 96 it immediately acts to raise the cue plate 72 to its original or normal position. Simultaneously, the previously tensioned spring 99 and also the weight of the the tone arm on the inner end of the cue arm 76 combine to urge the collar 74 in an upward direction along pin 73. As mentioned, this, however is only negligibly resisted by the spring 96 because most of its compressive force is expended in raising the cue plate 72. However, because the force of spring 99 combined with the weight of the tone arm is still considerably less than the force exerted by the operator on either key 29 or 30 to depress the same, it is balanced against the smaller resistance of the viscous material in the spaces between the ribs of the dampening pin 73 so that the cue arm 76 is rocked only slowly about pivot 76 and therefore controls or dampens lowering of the tone arm 14.

This it will be appreciated by the described embodiment that all of the recited objects, advantages and features of the invention have been demonstrated as obtainable in a highly practical structure, and a structure which is not only simple and positive to operate, but is also inexpensive to manufacture.

Having described my invention, I claim:

1. In a record player having a rotatable turntable a storage member for supporting a stack of records, a pick-up arm and change cycle means for lowering said records one at a time to the turntable and to position the pick-up arm for playing each said records when lowered to the turntable, the combination of a first member actuatable to energize a first motor which effects rotation of the turntable, a second member actuatable to operate means which initiate the change cycle means, an actuator operable to simultaneously actuate both said members, first latch means for holding said first member in an actuated position to continue rotation of the turntable, and means operated by the change cycle means which disengage said first latch means when the last record has been lowered and played by the pick-up arm to deenergize the motor, and second latch means actuatable to hold said second member in an actuated position to permit successive lowering of the records by the cycle change means without the pick-up arm playing the records.

2. The combination of claim 1 further including a second actuator and wherein said second latch means is actuatable by said second actuator into a position where it holds the second member in an actuated position and is releasable out of said position by the first actuator.

3. In a record player having a rotatable turntable, a storage member for supporting a stack of records, a pick-up arm and change cycle means for lowering said records one at a time to the turntable and to position the pick-up arm for playing each said records when lowered to the turntable, the combination of a first member moved into an actuatable position to energize a first motor which effects rotation of the turntable, a second member actuatable to operate means which initiate the change cycle means, an actuator operable to simultaneously actuate both said members, first latch means for holding said first member in an actuated position to continue rotation of the turntable, and means operated by the change cycle means which disengage said latch means when the last record has been lowered and played by the pick-up arm to deenergize the motor, said combination further including means for raising the pick-up arm independently of its operation by the change cycle means, a third actuator which simultaneously operates both the first and second members and also said means for raising the pick-up arm, and a third latch in association with said last mentioned means which when actuated by the third actuator holds the pick-up arm in raised position.

4. The combination of claim 3 wherein the third actuator is successively operable first to set said third latch and then to release it.

5. For a record player having a rotatable turntable, a pick-up arm, and a change cycle means for raising and moving the pick-up arm off the turntable, then lowering a record to the turntable and locating the pick-up arm in position over the record, the combination of an actuator for initiating said change cycle means, lift means operated by said actuator for raising the pick-up arm to a raised position above the turntable, latch means simultaneously operated by the actuator releasably latching the lift means in a position where it holds the pick-up arm in said raised position, and means manually actuatable separately of said actuator to release said latching of the lift means by the latch means to effect lowering of the pick-up arm to the record.

6. The combination of claim 5 further having damping means associated with said lift means which damps the lowering of the pick-up arm to the record upon actuation of the means separately autuatable to release the latching of the lift means by the latch means.

7. For a record player having a turntable and a first motor for rotating the turntable, a pick-up arm, a change cycle means for successfully lowering each record of a stack of records onto the turntable, for moving the pick-up arm between a position over the turntable and to one side to permit lowering of the records and positionment of the pick-up arm over each record as it is lowering and lowering of the pick-up arm to play the lowered records, and a second motor energizable to operate the change cycle means, the combination of a power switch for the first motor, a second switch for initiating operation of the second motor, a first lever actuatable to close the power switch, a second lever actuatable to temporarily close said second switch to initiate operation of the second motor, an actuator operable to actuate both said levers, and releasable latch means for holding said first lever in its actuated position to maintain the power switch closed, a pivotally mounted arm adapted to be rocked to raise the pick-up arm independently of the change cycle means, a second actuator operable to actuate both said first and second levers and also to rock said pivotally mounted arm, and a releasable latch member which is set by said second actuator and associated with the pivotally mounted arm to lock it in the position to which it is rocked to raise the pick-up arm.

8. The combination of claim 7 including a pivotally mounted plate associated with the pivotally mounted arm to rock said arm when pivoted, and a third actuator positioned to act on said plate when actuated to release the latch member set by the second actuator.

9. The combination of claim 7 wherein the second actuator operates a pivotally mounted plate having a yieldable connection with the pivotally mounted arm, the releasable latch member acting on said pivotally mounted plate, and said yielding connection acting as a damper when the latch member is released to cause the pivotally mounted arm to only slowly lower the pickup arm.

10. The combination of claim 9 wherein the yieldable connection comprises a stationary ribbed member carrying a friction inducing material in the spaces between the ribs, a collar slidable thereabout and supported on the rockable arm and a compressible spring about the pin and compressible between the collar and the pivotably mounted plate, the friction inducing material of the ribbed member tending to decelerate movement of the collar relative to the ribbed member.

11. The combination of claim 9 wherein the releasable latch member is movable between a latched position and a released position, the latch member having a sliding connection with the pivotably mounted plate and being biased in a direction transversely of said sliding connection such that when engaged by the second actuator in rocking the arm to a position to raise the pickup arm, the latch is located in its latched position and when engaged a second time is moved therefrom to its released position.

12. For a record player having a turntable and a first motor for rotating the turntable, a pick-up arm, a change cycle means for successfully lowering each record of a stack of records onto the turntable, for moving the pick-up arm between a position over the turntable and to one side to permit lowering of the records and positionment of the pick-up arm over each record as it is lowered and lowering of the pick-up arm to play the lowered records, and a second motor energizable to operate the change cycle means, the combination of a power switch for the first motor, a second switch for initiating operation of the second motor, a first lever actuatable to close the power switch, a second lever actuatable to temporarily close said second switch to initiate operation of the second motor, an actuator operable to actuate both said levers, and releasable latch means for holding said first lever in its actuated position to maintain the power switch closed, the first lever including an abutment and the second lever pivotally supporting a further latch including a hook portion, a further actuator adapted to act on said second lever and said further latch to actuate said lever and to engage the hook portion of the further latch to hold said second lever in a position where it closes the second switch, said hook being engageable about said abutment only when the first lever is in a latched condition, said hook disengaging from the abutment to reopen the second switch when the first lever is released.

13. The combination of claim 12 wherein the hook of the further latch is also releasable from the abutment by actuation of the first actuator.

14. Controls for a record player adapted for lowering a supply of records one at a time to a turntable for playing by a tone arm until all the records in the supply are lowered and played, the tone arm being raisable and lowerable and said controls comprising the combination of, first means mounted for movement to a stopping position where it is effective to initiate operation of means which stop the operation of the player; and second means mounted for movement to a starting position where it is effective to start the operation of the player and simultaneously to start lowering a lowermost one of the record supply to the turntable; third means mounted for movement to a pivoted position where it is effective to start the operation of the player and simultaneously to lower only the lowermost one of the record supply to the turntable; fourth means mounted for movement between a first position where it initiates further means to operatively lower the tone arm to the uppermost record on the turntable for playing and a second position where said fourth means acts on said further means to raise and hold the tone arm above the record on the turntable; and said third means being operatively connected to move said fourth means to the second position when said third means is moved to said pivoted position.

15. The controls claimed in claim 14 further comprising locking means actuated by the movement of the second means to the starting position and the third means to the pivoted position for operating the player until all the records in the supply are played.

16. The controls claimed in claim 15 further comprising interengaging means actuated by the movement of the first means to said stopping position for latching on said locking means until said locking means is released after the last record is played.

17. The controls as claimed in claim 16 wherein said interengaging means is pivotable and includes a ramp surface movable by the movement of the second means to the starting position and third means to the pivoted position for releasing the interengaging means.

18. The controls as claimed in claim 17 further comprising cue latch means mounted for holding said fourth means in said second position, said cue latch being movable to a release position upon operative engagement by the third means moving to said pivoted position and the fourth means to an unlatching position.

19. In a record player having a rotatable turntable, a storage member for supporting a stack of records, a pick-up arm and change cycle means for lowering said records one at a time to the turntable and to position the pick-up arm for playing each of said records when lowered to the turntable, the combination of a first member actuatable to initiate rotation of the turntable, a second member actuatable to initate the change cycle means, an actuator operable to simultaneously actuate both said members, a first latch means for holding said first member in an actuated position to continue rotation of the turntable until the last record has been lowered and played by the pick-up arm, a second latch means actuatable to hold said second member in an actuated position to permit successive lowering of the records by the change cycle means without the pick-up arm playing the records, and said second latch means being latched to the first member so as to be released when said first member is unlatched.

20. In a record player having a rotatable turntable, a storage member for supporting a stack of records, a pick-up arm and change cycle means for lowering said records one at a time to the turntable and to position the pick-up arm for playing each of said records when lowered to the turntable, the combination of a first member actuatable to initiate rotation of the turntable, a second member actuatable to initiate the change cycle means, an actuator operatable to simultaneously actuate both said members, latch means for holding said first member in an actuated position to continue rotation of the turntable until the last record has been lowered and played by the pick-up arm, means for raising the pick-up arm independently of its operation by the change cycle means, a third actuator which simultaneously operates both the first and second members and also said means for raising the pick-up arm, a third latch in association with said last mentioned means which when actuated by the third actuator holds the pick-up arm in raised position, and a fourth actuator which is actuatable to release said latch so as to lower the pick-up arm.

References Cited

UNITED STATES PATENTS

| | | | |
|---|---|---|---|
| 3,385,603 | 5/1968 | Knople | 274—15 |
| 3,305,238 | 2/1967 | Carlson | 274—10 |
| 2,564,455 | 8/1951 | Stolberg | 274—10 |

FOREIGN PATENTS

| | | |
|---|---|---|
| 519,300 | 5/1963 | Belgium. |

LEONARD FORMAN, Primary Examiner

S. L. STEPHAN, Assistant Examiner